(12) United States Patent
Cha (10) Patent No.: US 12,351,243 B2
(45) Date of Patent: Jul. 8, 2025

(54) VEHICLE BODY STRUCTURE

(71) Applicants: Hyundai Motor Company, Seoul (KR); Kia Corporation, Seoul (KR)

(72) Inventor: Hyo Seop Cha, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 403 days.

(21) Appl. No.: 18/156,791

(22) Filed: Jan. 19, 2023

(65) Prior Publication Data

US 2024/0109600 A1 Apr. 4, 2024

(30) Foreign Application Priority Data

Oct. 4, 2022 (KR) .................. 10-2022-0126370

(51) Int. Cl.
*B62D 25/20* (2006.01)

(52) U.S. Cl.
CPC ..... *B62D 25/2027* (2013.01); *B62D 25/2036* (2013.01)

(58) Field of Classification Search
CPC .......................... B60N 2/015; B60Y 2304/03; B60Y 2306/01; B62D 21/11; B62D 21/152; B62D 25/08; B62D 25/20; B62D 25/2029; B62D 25/2027; B62D 25/2036
See application file for complete search history.

(56) References Cited

U.S. PATENT DOCUMENTS

| | | | |
|---|---|---|---|
| 4,759,580 A | 7/1988 | Berklich, Jr. et al. | |
| 5,529,376 A | 6/1996 | Jovan et al. | |
| 2006/0061143 A1* | 3/2006 | Okana | B62D 21/10 |
| | | | 296/204 |
| 2006/0087109 A1* | 4/2006 | Kusu | B62D 25/2027 |
| | | | 280/831 |
| 2012/0318591 A1* | 12/2012 | Lim | B60K 1/04 |
| | | | 903/903 |
| 2022/0204093 A1 | 6/2022 | Kang | |

FOREIGN PATENT DOCUMENTS

| | | | | |
|---|---|---|---|---|
| EP | 1612128 A1 * | 1/2006 | | B60K 13/04 |
| JP | H0840117 A | 2/1996 | | |
| JP | 2004291682 A | 10/2004 | | |

(Continued)

OTHER PUBLICATIONS

FR3018231A1 with English Translation (Year: 2015).*

*Primary Examiner* — Lori Lyjak (74) *Attorney, Agent, or Firm* — Slater Matsil, LLP (57) ABSTRACT

An embodiment is a vehicle body structure including a floor panel, rear side members respectively coupled to lower sides of two opposite ends of the floor panel and elongated extending in a lengthwise direction of a vehicle, a partition member mounted and extending in a transverse direction of the lengthwise direction of the vehicle, the partition member and protruding upward from the floor panel, the partition member having two opposite ends coupled to upper sides of the rear side members with the floor panel interposed therebetween, a plurality of rear mounting brackets provided on an upper side of the partition member to support a rear side of a seat, and front mounting components provided at a front side of the partition member and disposed at an upper side of the floor panel to support a front side of the seat.

18 Claims, 14 Drawing Sheets

(56) References Cited

FOREIGN PATENT DOCUMENTS

| | | | |
|---|---|---|---|
| JP | 2007083788 | A | 4/2007 |
| JP | 2015003634 | A | 1/2015 |
| KR | 20000021451 | U | 12/2000 |
| KR | 20140122150 | A | 10/2014 |
| KR | 20220096102 | A | 7/2022 |

* cited by examiner

VEHICLE BODY STRUCTURE

CROSS-REFERENCE TO RELATED APPLICATIONS

The present application claims priority to Korean Patent Application No. 10-2022-0126370, filed Oct. 4, 2022, which application is incorporated herein in its entirety.

TECHNICAL FIELD

The present invention relates to a technology associated with a vehicle body structure.

BACKGROUND

Recently, a floor of a vehicle is configured flat to a rear side of a vehicle body.

For example, as a height of a floor of a vehicle such as a purpose-built vehicle (PBV) decreases, the vehicle often tends to have a flat shape formed to the vehicle body.

For reference, a purpose-built vehicle (PBV) includes a life module configured to define passenger and loading spaces having various shapes in accordance with the market demand, and a drive module substantially related to the driving of the vehicle. The life module, which may meet various demands, may be coupled to the predetermined drive module, such that various types of vehicles may be easily produced, which makes it possible to very effectively follow the market trend of diversified small-quantity production.

In the case of the vehicle having the flat floor formed to the rear side of the vehicle body, there is a comparatively large difference in height between the floor and a seating surface of a seat at the time of installing the seat in the vicinity of a rear wheel at rear side of the vehicle body, which makes it difficult to ensure secure mountability of the seat.

The foregoing explained as the background of the invention is intended merely to aid in the understanding of the background of the present invention, and is not intended to mean that the present invention falls within the purview of the related art that is already known to those skilled in the art.

SUMMARY

The embodiments of the present invention is proposed to solve these problems and aims to provide a vehicle body structure that enables a seat to be securely fixed while further improving rigidity of a vehicle body without increasing a weight of a vehicle in a situation in which there is a large difference in height between a floor in the vicinity of a rear wheel of the vehicle and a seating surface of a seat mounted on the floor.

To achieve the above-mentioned object, the embodiments of the present invention provides a vehicle body structure including: a floor panel; rear side members respectively coupled to lower sides of two opposite ends of the floor panel and elongated in a forward/rearward direction of a vehicle; a partition member mounted to be elongated in a transverse direction of a vehicle body and protruding upward from the floor panel, the partition member having two opposite ends coupled to upper sides of the rear side members with the floor panel interposed therebetween; a plurality of rear mounting brackets provided on an upper side of the partition member to support a rear side of a seat; and front mounting components provided at a front side of the partition member and disposed at an upper side of the floor panel to support a front side of the seat.

The partition member may include: a front part coupled to the upper side of the floor panel; a rear part coupled to the upper side of the floor panel and spaced apart from the front part in a direction toward a rear side of the vehicle body; an upper part configured to connect an upper end of the front part and an upper end of the rear part, and the front part, the upper part, and the rear part may each have a panel shape.

One or more bulkheads may be provided in the partition member.

Quarter inner panels may be coupled to upper sides of the two opposite ends of the floor panel, and the two opposite ends of the partition member may be coupled to the quarter inner panels.

The front mounting components may be configured as a plurality of front mounting brackets disposed to be spaced apart from one another in the transverse direction of the vehicle body.

The plurality of front mounting brackets may include front side mounting brackets coupled to the upper sides of the rear side members and the quarter inner panels with the floor panel interposed therebetween.

The plurality of front mounting brackets may further include a front center mounting bracket installed at a center of the floor panel based on the transverse direction of the vehicle body, and the front center mounting bracket may be coupled to an upper side of a rear cross member having two opposite ends coupled to the rear side members with the floor panel interposed therebetween.

The front mounting component may be configured as a front mounting member installed to be elongated in the transverse direction of the vehicle body so that two opposite ends thereof are coupled to the upper sides of the rear side members through the floor panel.

The floor panel may have side walls bent upward and partially provided at two opposite sides coupled to the quarter inner panels, extension side brackets may be provided at portions where the side walls of the floor panel meet the partition member, and the extension side brackets may connect and support the side walls and the partition member.

Suspension mounting spaces may be formed at the lower side of the floor panel and disposed between the rear side members and the side walls, upper ends of shock absorbers may be inserted and fixed into the suspension mounting spaces, and a front suspension mounting bracket and a rear extension mounting bracket may be provided in the suspension mounting space, spaced apart from each other in the forward/rearward direction of the vehicle body, and installed to connect the rear side member and the side wall.

A shock absorber fixing bracket may be installed between the front suspension mounting bracket and the rear extension mounting bracket and fix the inserted shock absorber.

A spring seat may be provided at a lower side of the rear extension mounting bracket.

The extension side bracket may be coupled to the rear extension mounting bracket with the side wall of the floor panel interposed therebetween.

The bulkheads may be disposed in the partition member to which the extension side brackets are coupled.

An additional rear cross member may be further provided at the lower side of the floor panel and elongated in the transverse direction of the vehicle body to connect the two opposite rear extension mounting brackets.

The rear mounting bracket may be provided at an upper side of a closed space defined by the bulkheads in the partition member.

The embodiments of the present invention may provide the vehicle body structure that enables the seat to be securely fixed while further improving rigidity of the vehicle body without increasing the weight of the vehicle in the situation in which there is a large difference in height between the floor in the vicinity of the rear wheel of the vehicle and the seating surface of the seat mounted on the floor.

DETAILED DESCRIPTION OF ILLUSTRATIVE EMBODIMENTS

Hereinafter, embodiments disclosed in the present specification will be described in detail with reference to the accompanying drawings. The same or similar constituent elements are assigned with the same reference numerals regardless of reference numerals, and the repetitive description thereof will be omitted.

The suffixes 'module', 'unit', 'part', and 'portion' used to describe constituent elements in the following description are used together or interchangeably in order to facilitate the description, but the suffixes themselves do not have distinguishable meanings or functions.

In the description of the exemplary embodiments disclosed in the present specification, the specific descriptions of publicly known related technologies will be omitted when it is determined that the specific descriptions may obscure the subject matter of the exemplary embodiments disclosed in the present specification. In addition, it should be understood that the accompanying drawings are provided only to allow those skilled in the art to easily understand the exemplary embodiments disclosed in the present specification, and the technical spirit disclosed in the present specification is not limited by the accompanying drawings, and includes all alterations, equivalents, and alternatives that are included in the spirit and the technical scope of the present invention.

The terms including ordinal numbers such as "first," "second," and the like may be used to describe various constituent elements, but the constituent elements are not limited by the terms. These terms are used only to distinguish one constituent element from another constituent element.

When one constituent element is described as being "coupled" or "connected" to another constituent element, it should be understood that one constituent element can be coupled or connected directly to another constituent element, and an intervening constituent element can also be present between the constituent elements. When one constituent element is described as being "coupled directly to" or "connected directly to" another constituent element, it should be understood that no intervening constituent element is present between the constituent elements.

Singular expressions include plural expressions unless clearly described as different meanings in the context.

In the present specification, it should be understood the terms "comprises," "comprising," "includes," "including," "containing," "has," "having" or other variations thereof are inclusive and therefore specify the presence of stated features, integers, steps, operations, elements, components, or combinations thereof, but do not preclude the presence or addition of one or more other features, integers, steps, operations, elements, components, or combinations thereof.

Referring to FIGS. 1 to 12, a vehicle body structure according to an embodiment of the present invention includes: a floor panel 1; rear side members 3 respectively coupled to lower sides of two opposite ends of the floor panel 1 and elongated in a forward/rearward direction of a vehicle; a partition member 5 mounted to be elongated in a transverse direction of a vehicle body and protruding upward from the floor panel 1, the partition member 5 having two opposite ends coupled to upper sides of the rear side members 3 with the floor panel 1 interposed therebetween; a plurality of rear mounting brackets 7 provided on an upper side of the partition member 5 to support a rear side of a seat S; and front mounting components provided at a front side of the partition member 5 and disposed at an upper side of the floor panel 1 to support a front side of the seat S.

That is, in the present invention, the seat S may be securely fixed to the floor panel 1 by the front mounting components and the rear mounting bracket 7 in the state in which the front mounting components, the partition member 5, and the rear mounting bracket 7 are mounted at the upper side of the floor panel 1.

Figure 10:
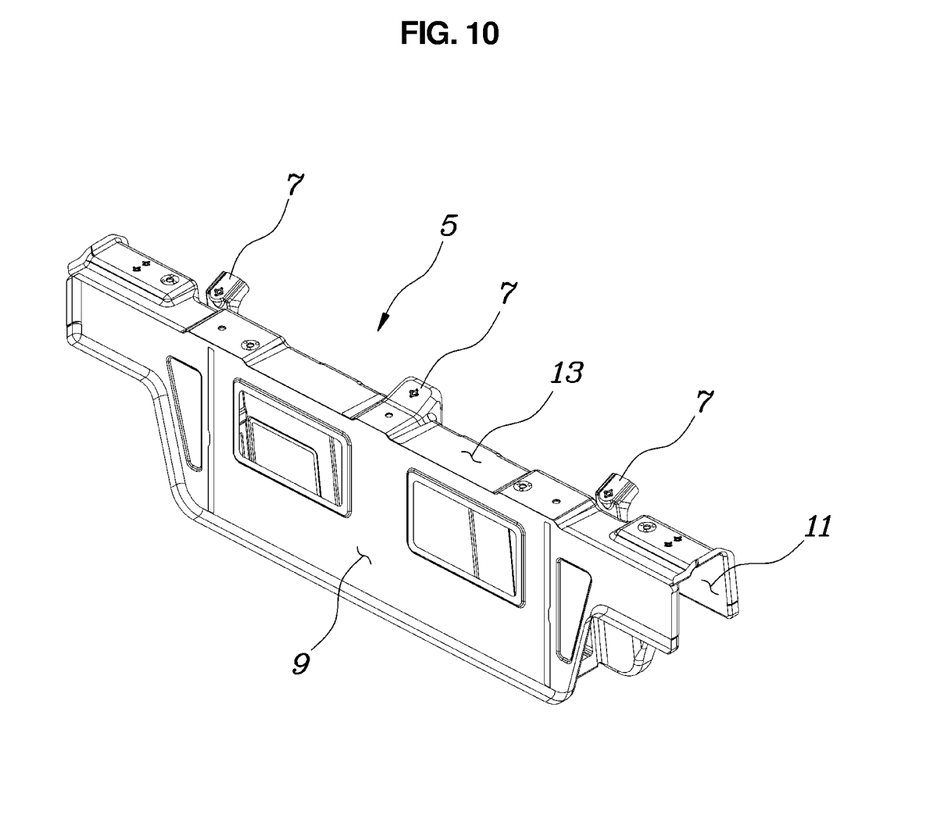
FIG. 10 is a view illustrating a state in which a partition member in FIG. 9 remains.
Figure 11:
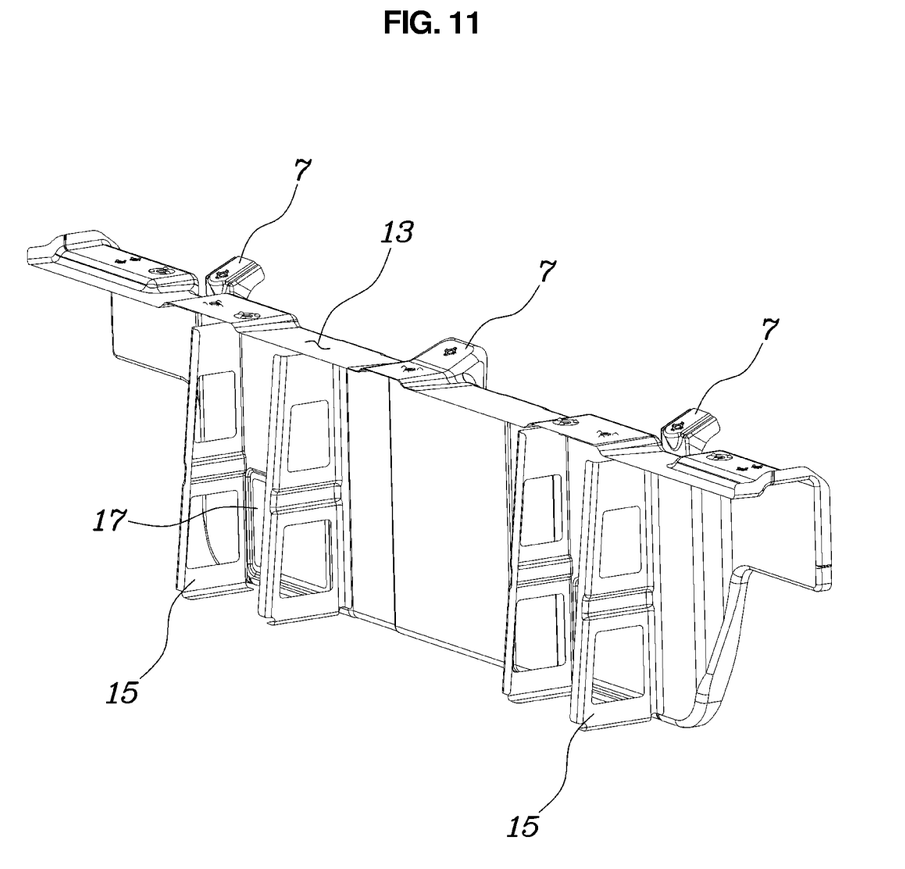
FIG. 11 is a view illustrating a state in which front part of the partition member in FIG. 10 is excluded.

In the present embodiment, the partition member 5 includes: a front part 9 coupled to the upper side of the floor panel 1; a rear part 11 coupled to the upper side of the floor panel 1 and spaced apart from the front part 9 in a direction toward a rear side of the vehicle body; an upper part 13 configured to connect an upper end of the front part 9 and an upper end of the rear part 11. The front part 9, the upper part 13, and the rear part 11 each have a panel shape.

For example, the partition member 5 may be configured by coupling, by welding or the like, panels constituting the front part 9 and panels constituting the upper part 13 and the rear part 11.

Alternatively, in the case of the partition member 5, the front part 9, the rear part 11, and the upper part 13 may be respectively provided as separate panels and coupled to one another. Alternatively, the front part 9, the upper part 13, and the rear part 11 may be integrally formed by bending a single panel.

In this case, even though the partition member 5 is manufactured by any method, the partition member 5 needs to have a space therein to define a closed cross-section together with the floor panel 1, thereby ultimately improving rigidity of the vehicle body without greatly increasing the weight of the vehicle.

In addition, one or more bulkheads 15 are provided in the partition member 5 to improve rigidity of the partition member 5, thereby more securely supporting the seat S together with the rear mounting bracket 7 and ultimately improving rigidity of the vehicle body.

In particular, in case that the rear mounting bracket 7 is provided at an upper side of a closed space defined by the bulkheads 15 in the partition member 5, it is possible to support the seat S in a more secure state.

For reference, in the drawings, passing holes 17 are formed in the partition member 5 so that welding is performed on the bulkhead 15.

Figure 1:
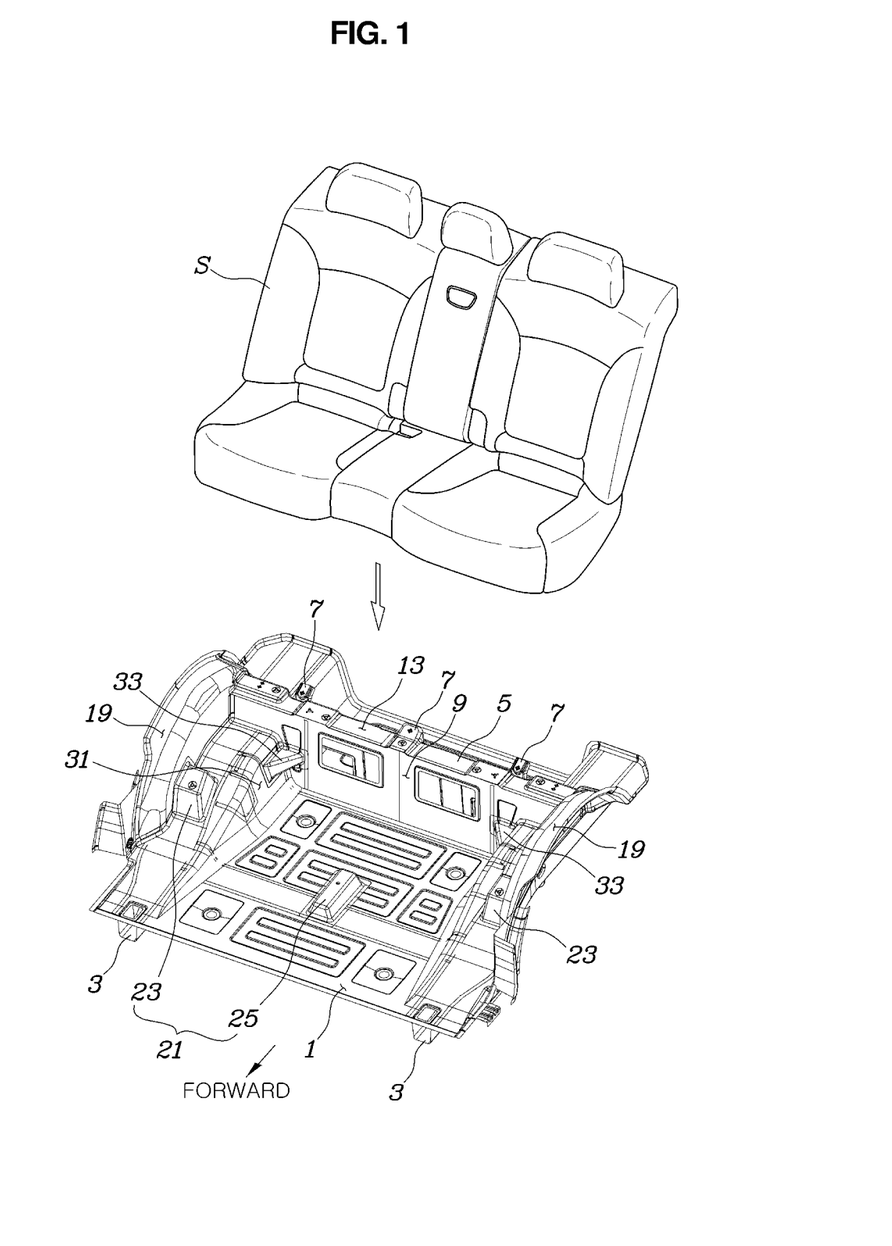
FIG. 1 is a view illustrating a vehicle body structure according to the present invention.
Figure 2:
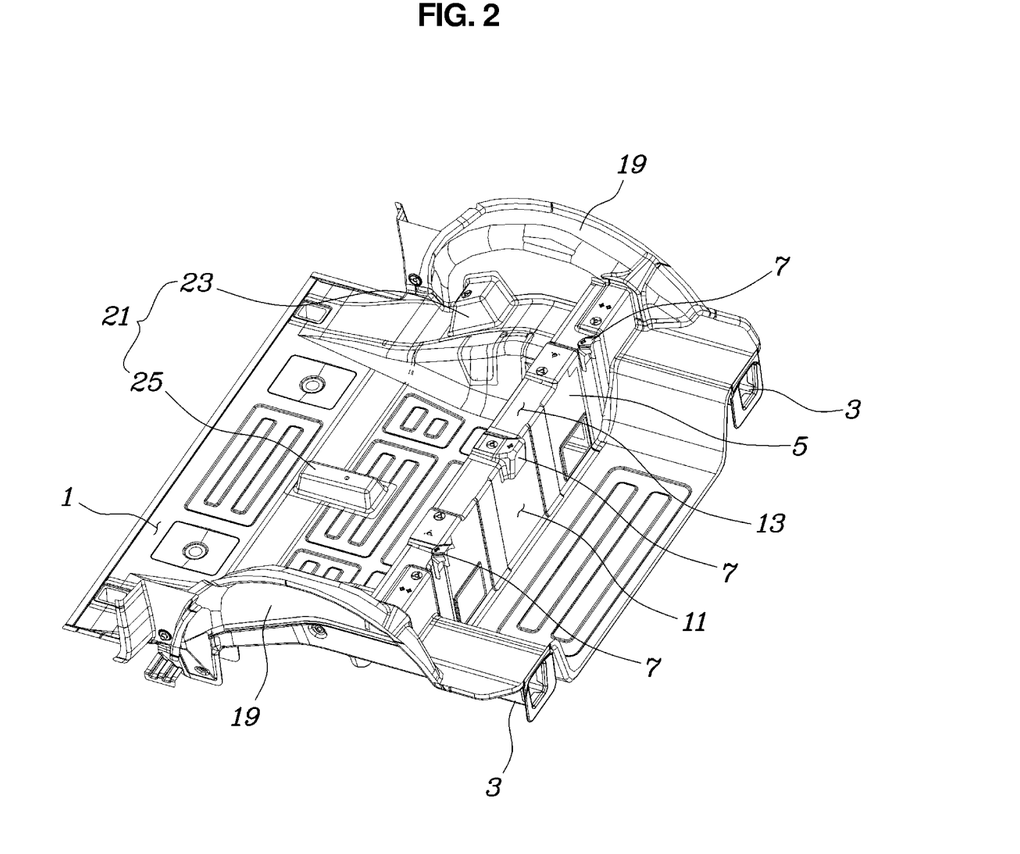
FIG. 2 is a view illustrating the vehicle body structure in FIG. 1 when viewed from the rear side.
Figure 3:
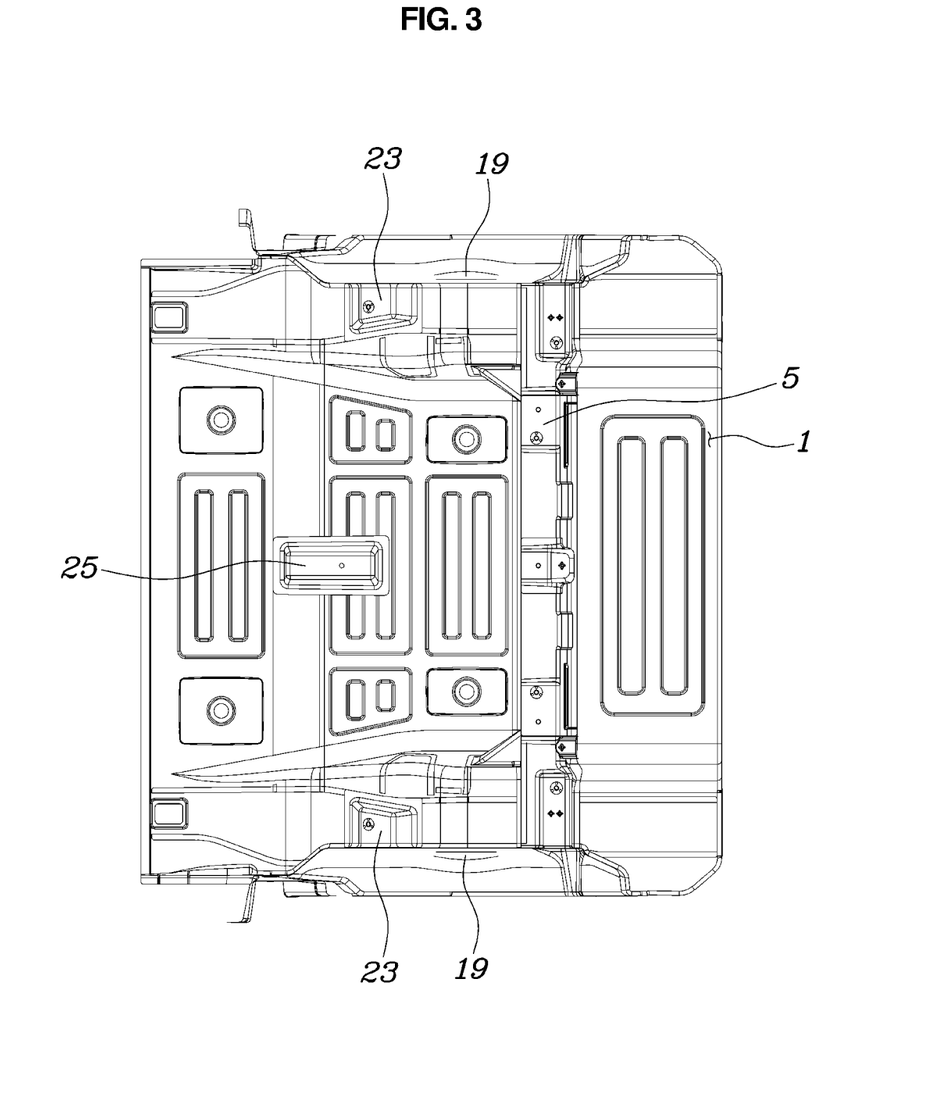
FIG. 3 is a top plan view illustrating the vehicle body structure in FIG. 1 when viewed from the top side.
Figure 4:
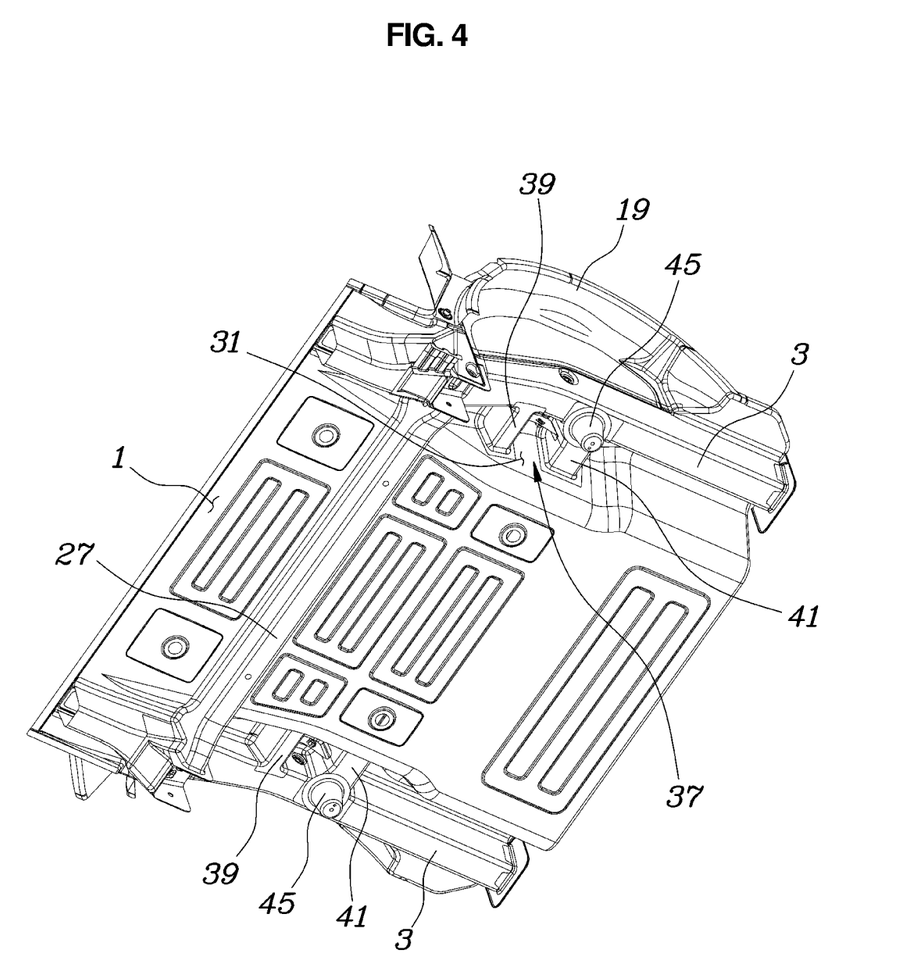
FIG. 4 is a view illustrating the vehicle body structure in FIG. 1 when viewed from the bottom side.
Figure 5:
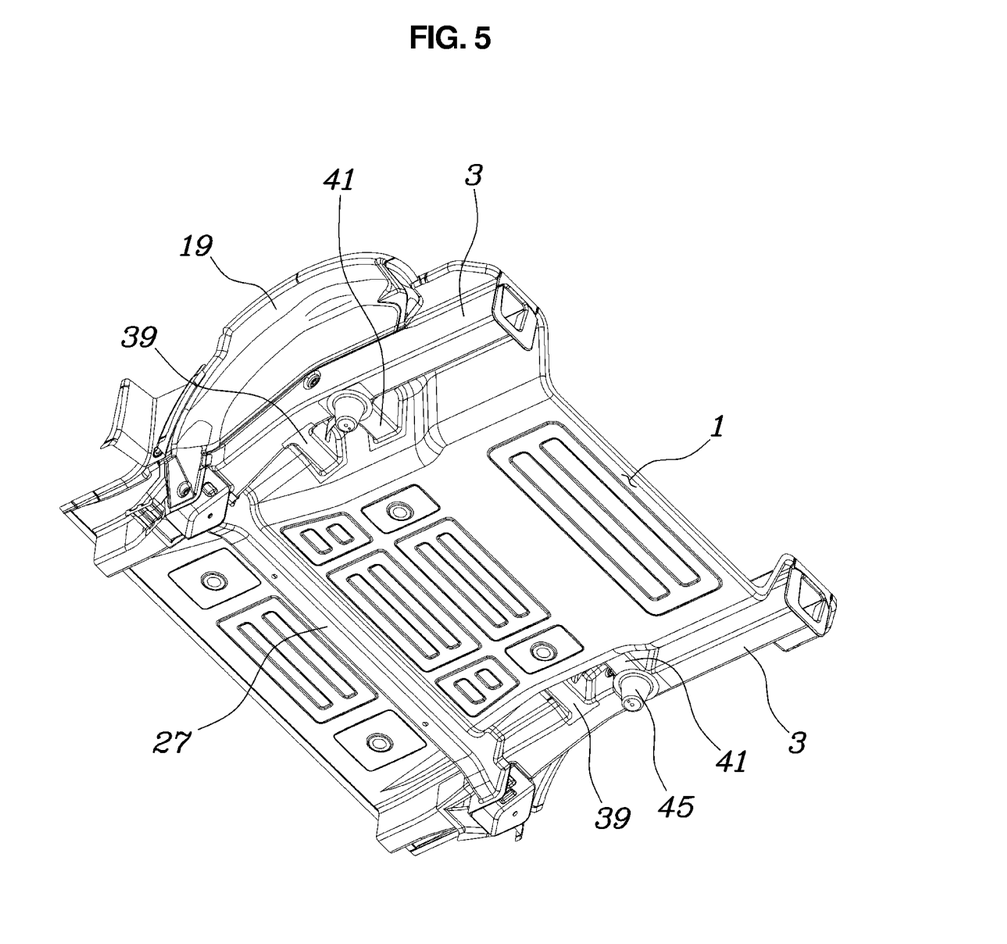
FIG. 5 is a view illustrating the vehicle body structure in FIG. 4 when viewed at another angle.
Figure 6:
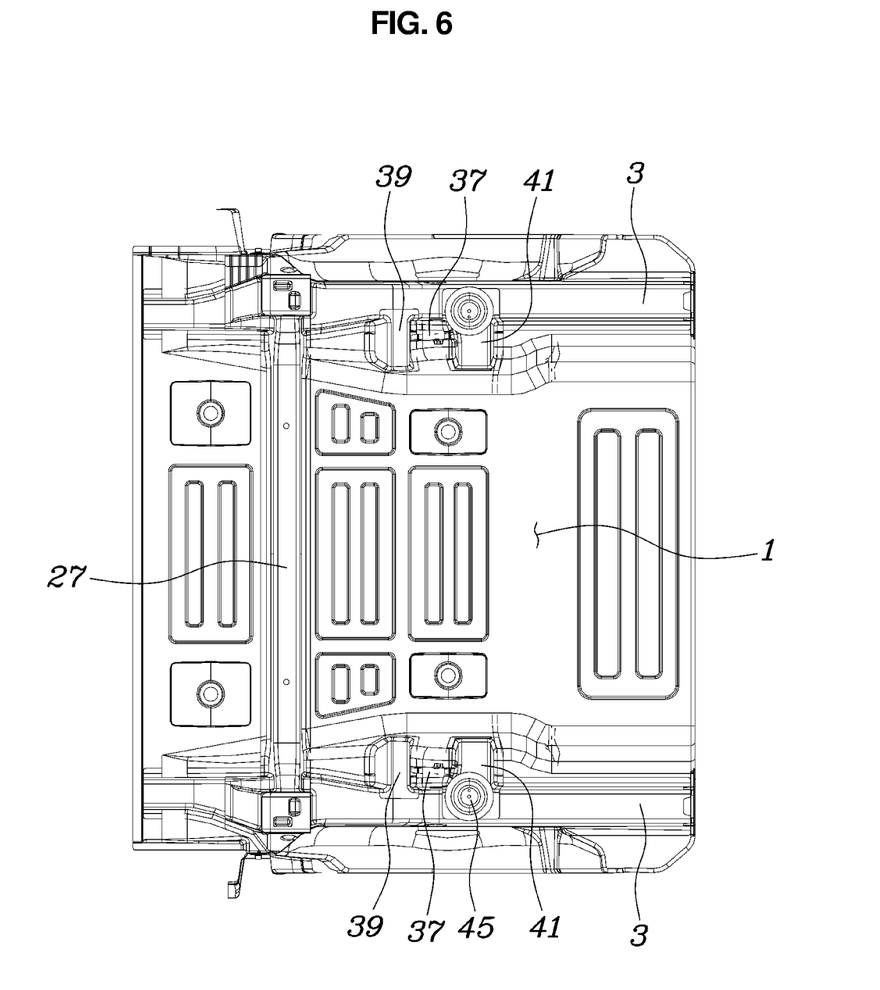
FIG. 6 is a bottom plan view illustrating the vehicle body structure in FIG. 5 when viewed from the bottom side.
Figure 7:
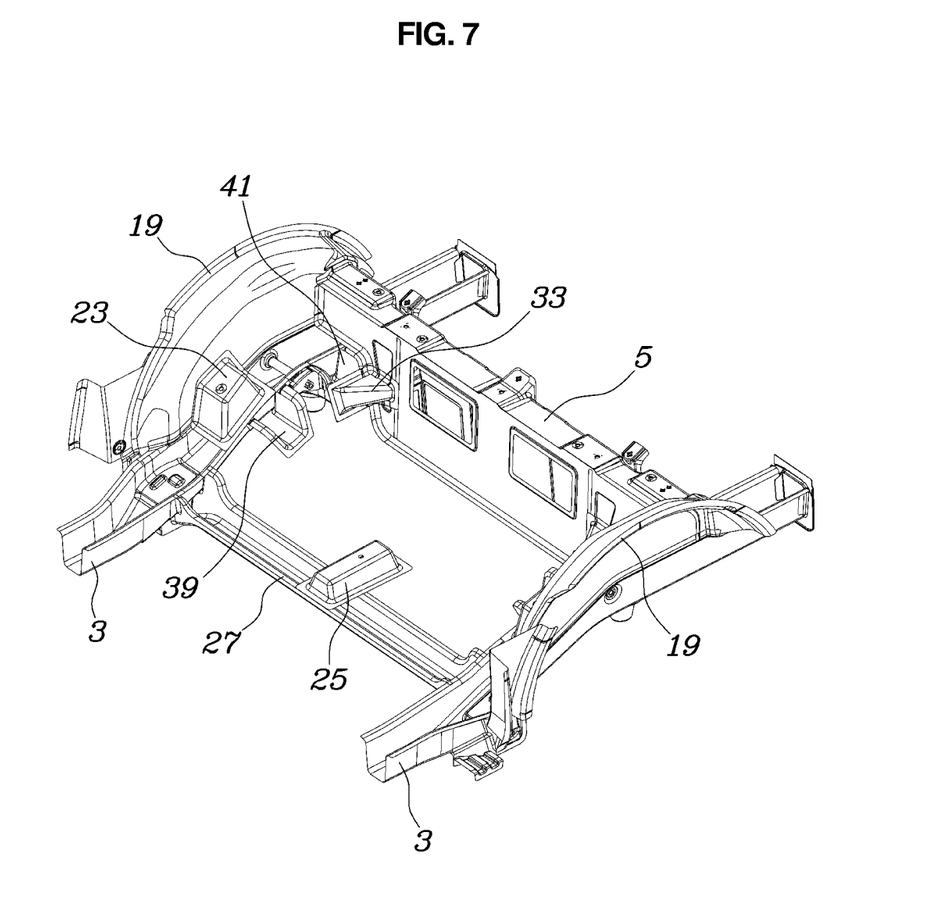
FIG. 7 is a view illustrating a state in which a floor panel is excluded from the vehicle body structure in FIG. 1.

Quarter inner panels 19 are coupled to upper sides of the two opposite ends of the floor panel 1, and the two opposite ends of the partition member 5 are coupled to the quarter inner panels 19.

That is, lower sides of the partition member 5 are coupled to the rear side members 3 with the floor panel 1 interposed therebetween in the state in which the two opposite ends of the partition member 5 are blocked by the quarter inner panels 19.

For reference, in the present embodiment, the quarter inner panel 19 is provided in the form of a wheel housing that surrounds a rear wheel of the vehicle.

The front mounting components may be configured as a plurality of front mounting brackets 21 disposed to be spaced apart from one another in the transverse direction of the vehicle body.

That is, the plurality of front mounting brackets 21 may include: front side mounting brackets 23 coupled to the upper sides of the rear side members 3 and the quarter inner panels 19 with the floor panel 1 interposed therebetween; and a front center mounting bracket 25 installed at a center of the floor panel 1 based on the transverse direction of the vehicle body.

Figure 8:
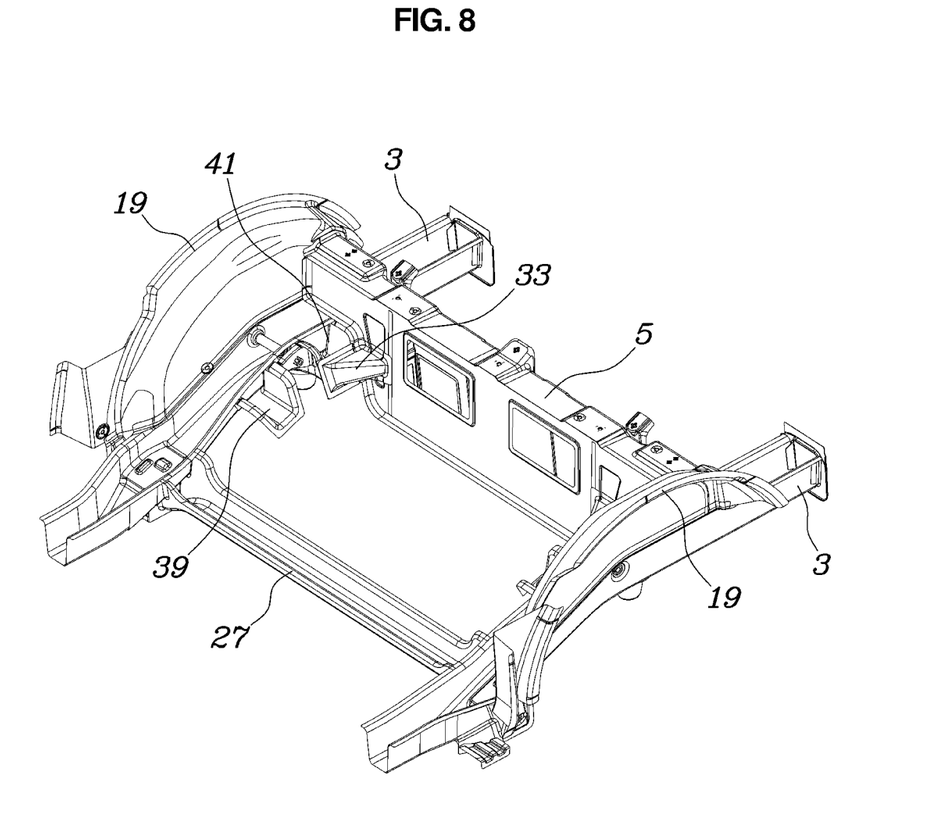
FIG. 8 is a view illustrating a state in which front mounting brackets in FIG. 7 are excluded.

In this case, the front center mounting bracket 25 may be structured to be coupled to an upper side of a rear cross member 27 having two opposite ends coupled to the rear side members 3 with the floor panel 1 interposed therebetween.

With this structure, the front side mounting brackets 23 is coupled to the rear side members 3 with the floor panel 1 interposed therebetween, and the front center mounting bracket 25 is coupled to the rear cross member 27 with the floor panel 1 interposed therebetween, which makes it possible to ensure sufficient rigidity for fixing the seat S.

Figure 9:
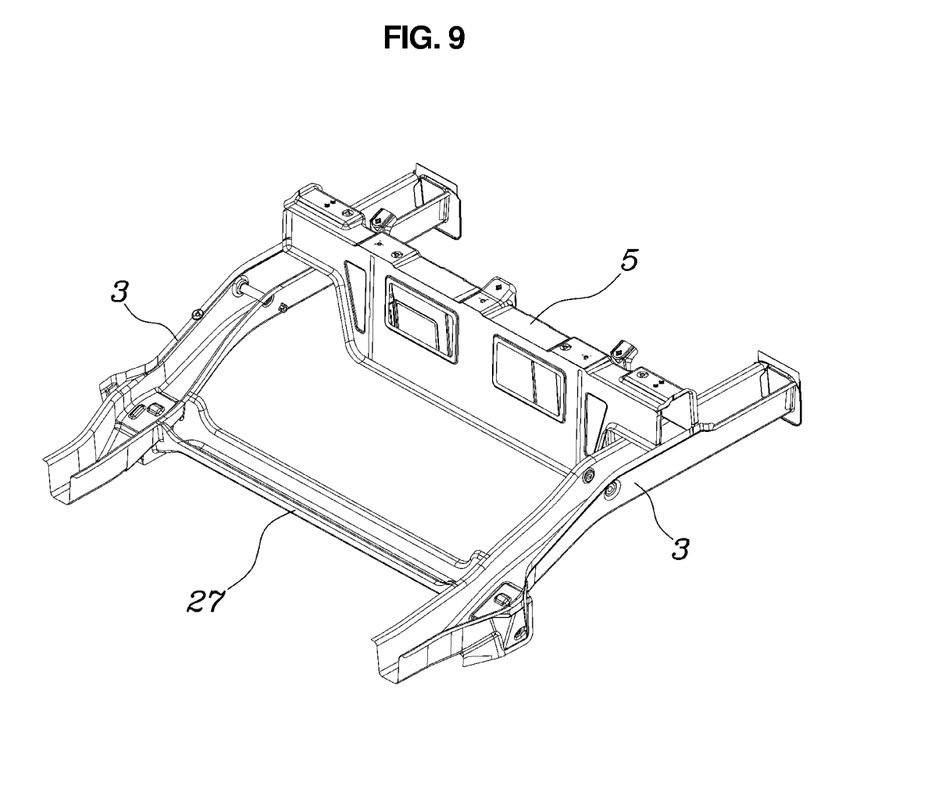
FIG. 9 is a view illustrating a state in which a partition member, a rear side member, and a rear cross member in FIG. 8 remain.

In addition, as illustrated in FIG. 9, the rear cross member 27, the partition member 5, and the two opposite rear side members 3 define a rectangular lattice structure, when the floor panel 1 is viewed from above, which makes it possible to ensure more secure rigidity of the vehicle body together with the floor panel 1.

Figure 13:
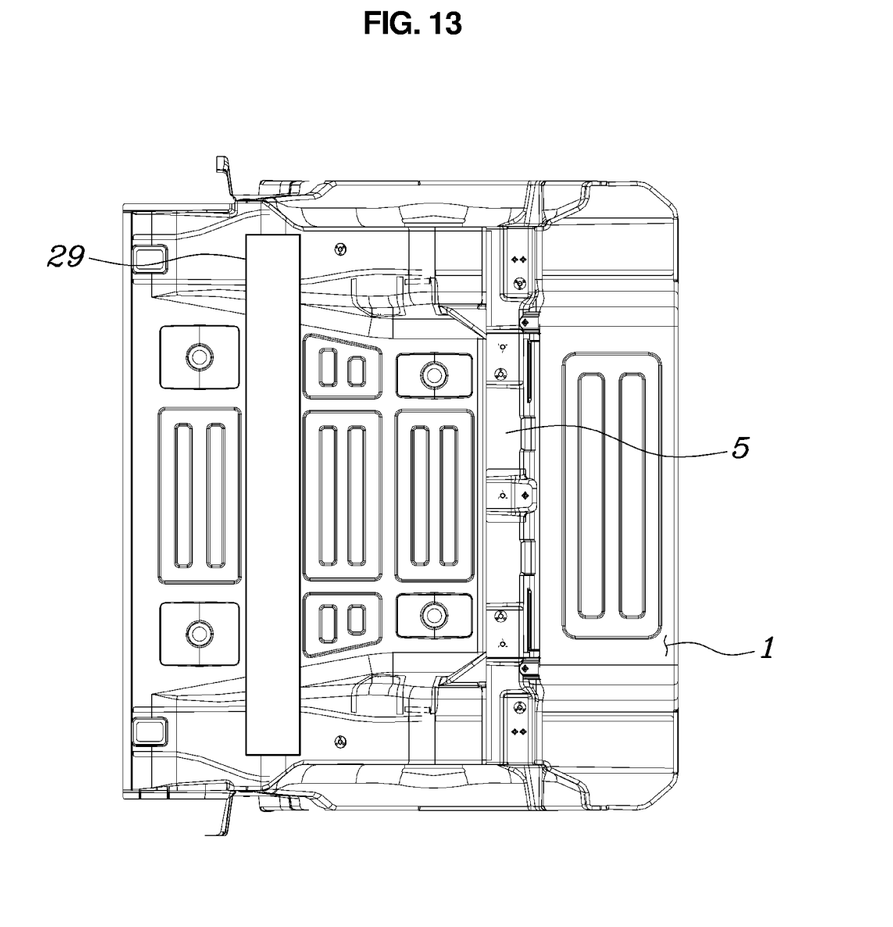
FIG. 13 is a view for explaining an example in which in the top plan view in FIG. 3, a single front mounting member is installed instead of the front mounting brackets.

Meanwhile, in addition to the above-mentioned embodiment, as illustrated in FIG. 13, the front mounting component may be configured as a front mounting member 29 installed to be elongated in the transverse direction of the vehicle body so that two opposite ends thereof are coupled to the upper sides of the rear side members 3 through the floor panel 1.

The floor panel 1 has side walls 31 bent upward and partially provided at two opposite sides coupled to the quarter inner panels 19. Extension side brackets 33 are provided at portions where the side walls 31 of the floor panel 1 meet the partition member 5, and the extension side brackets 33 connect and support the side walls 31 and the partition member 5.

Therefore, the partition member 5 and the floor panel 1 define a three-dimensional connection relationship, which makes it possible to ensure the more securely coupled state.

Figure 12:
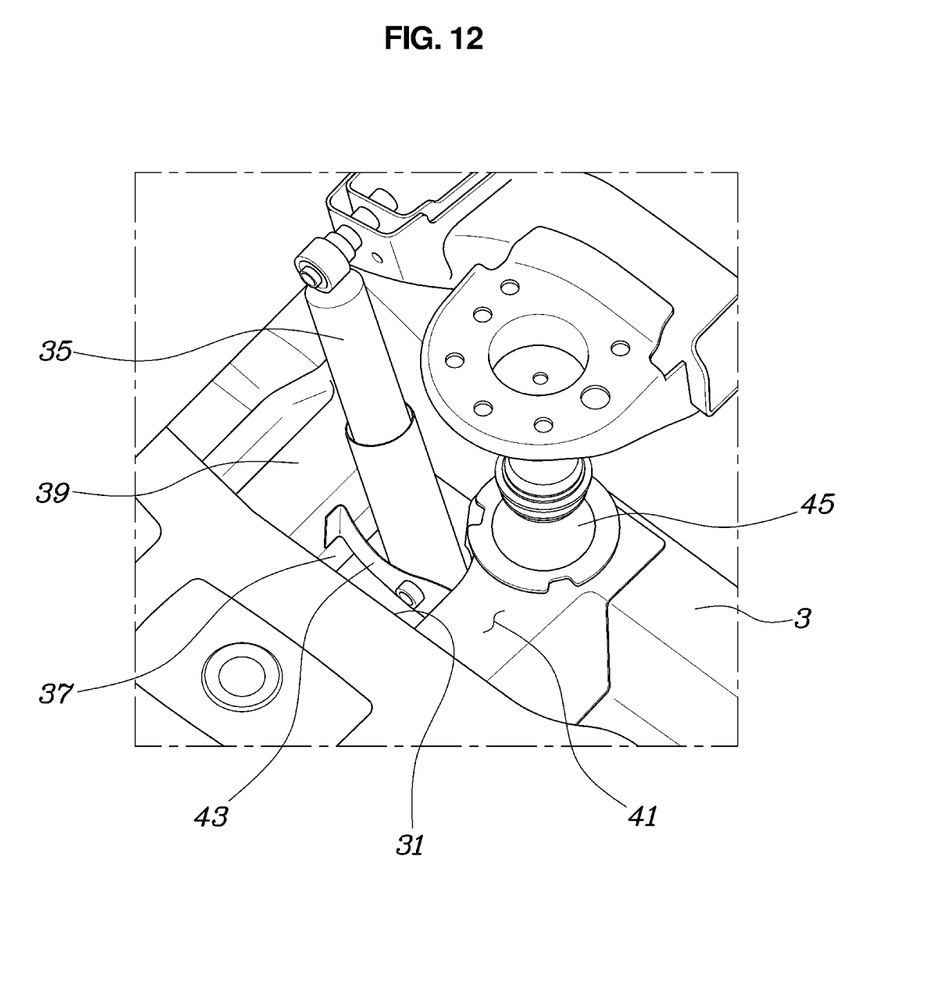
FIG. 12 is a view illustrating an example in which a shock absorber is inserted and mounted in a suspension mounting space provided below a floor panel.

Suspension mounting spaces 37 are formed at the lower side of the floor panel 1 and disposed between the rear side members 3 and the side walls 31, and upper ends of shock absorbers 35 are inserted and fixed into the suspension mounting spaces 37. A front suspension mounting bracket 39 and a rear extension mounting bracket 41 are provided in the suspension mounting space 37, spaced apart from each other in the forward/rearward direction of the vehicle body, and installed to connect the rear side member 3 and the side wall 31.

In addition, a shock absorber fixing bracket 43 is installed between the front suspension mounting bracket 39 and the rear extension mounting bracket 41 and fixes the inserted shock absorber 35.

That is, an upper side of the shock absorber 35, which constitutes a suspension system, is fixed by the shock absorber fixing bracket 43 in the state in which four sides of the shock absorber 35 are restricted by the floor panel 1, the rear side member 3, the front suspension mounting bracket 39, and the rear extension mounting bracket 41.

Therefore, a vehicle body portion for supporting the upper side of the shock absorber 35 has secure rigidity and supports the upper end of the shock absorber 35.

In addition, a spring seat 45 is provided at a lower side of the rear extension mounting bracket 41 and supports a spring that constitutes the suspension system.

In the present embodiment, the extension side bracket 33 is coupled to the rear extension mounting bracket 41 with the side wall 31 of the floor panel 1 interposed therebetween, which makes it possible to support the suspension system by using more secure rigidity of the vehicle body.

In addition, in case that the bulkheads 15 are disposed in the partition member 5 to which the extension side brackets 33 are coupled, a more complex coupled state is formed, which makes it possible to constitute the more rigid vehicle body.

Figure 14:
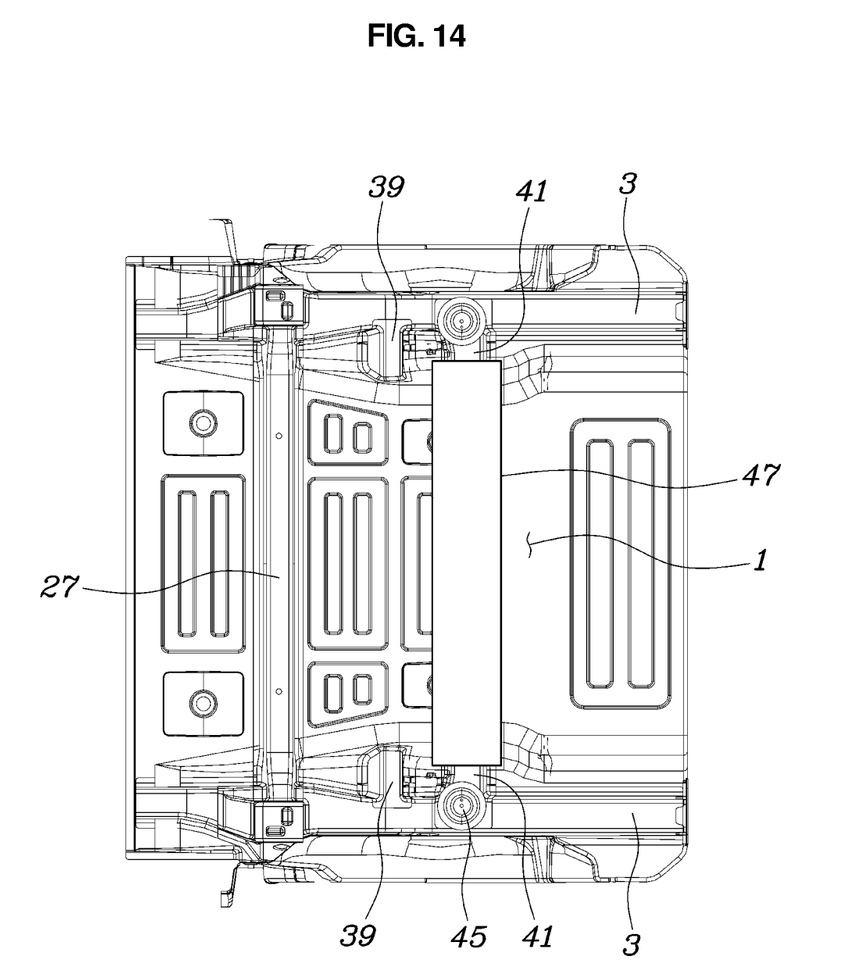
FIG. 14 is a view for explaining an example in which in the bottom plan view in FIG. 6, an additional rear cross member is further provided.

Meanwhile, as illustrated in FIG. 14, an additional rear cross member 47 is further provided at the lower side of the floor panel 1 and elongated in the transverse direction of the vehicle body to connect the two opposite rear extension mounting brackets 41, which makes it possible to further reinforce the rigidity of the vehicle body.

While the specific embodiments of the present invention have been illustrated and described, it will be obvious to those skilled in the art that the present invention may be variously modified and changed without departing from the technical spirit of the present invention defined in the appended claims.

What is claimed is:

1. A vehicle body structure comprising:
    a floor panel;
    rear side members respectively coupled to lower sides of two opposite ends of the floor panel and extending in a lengthwise direction of a vehicle;
    a partition member mounted and extending in a transverse direction of the lengthwise direction of the vehicle, the partition member protruding upward from the floor panel, the partition member having two opposite ends coupled to upper sides of the rear side members with the floor panel interposed therebetween;
    a plurality of rear mounting brackets provided on an upper side of the partition member to support a rear side of a seat; and
    front mounting components provided at a front side of the partition member and disposed at an upper side of the floor panel to support a front side of the seat.

2. The vehicle body structure of claim 1, wherein the partition member comprises:
    a front part coupled to the upper side of the floor panel;
    a rear part coupled to the upper side of the floor panel and spaced apart from the front part in a direction toward a rear side of the vehicle body structure; and
    an upper part configured to connect an upper end of the front part and an upper end of the rear part, the front part, the upper part, and the rear part each having a panel shape.

3. The vehicle body structure of claim 2 further comprising:
    one or more bulkheads in the partition member.

4. The vehicle body structure of claim 3 further comprising:
    quarter inner panels coupled to upper sides of the two opposite ends of the floor panel, the two opposite ends of the partition member being coupled to the quarter inner panels.

5. The vehicle body structure of claim 4, wherein the front mounting components are configured as a plurality of front mounting brackets disposed to be spaced apart from one another in the transverse direction of the vehicle body structure.

6. The vehicle body structure of claim 5, wherein the plurality of front mounting brackets comprises front side mounting brackets coupled to the upper sides of the rear side members and the quarter inner panels with the floor panel interposed therebetween.

7. The vehicle body structure of claim 6, wherein the plurality of front mounting brackets further comprises a front center mounting bracket installed at a center of the floor panel based on the transverse direction of the vehicle body structure, and wherein the front center mounting bracket is coupled to an upper side of a rear cross member having two opposite ends coupled to the rear side members with the floor panel interposed therebetween.

8. The vehicle body structure of claim 4, wherein each front mounting component is configured as a front mounting member installed to be elongated in the transverse direction of the vehicle body structure so that two opposite ends thereof are coupled to the upper sides of the rear side members through the floor panel.

9. The vehicle body structure of claim 4, wherein the floor panel has side walls bent upward and partially provided at two opposite sides coupled to the quarter inner panels, and wherein extension side brackets are provided at portions where the side walls of the floor panel meet the partition member, and the extension side brackets connect and support the side walls and the partition member.

10. The vehicle body structure of claim 9, wherein suspension mounting spaces are formed at the lower side of the floor panel and disposed between the rear side members and the side walls, wherein upper ends of shock absorbers are inserted and fixed into the suspension mounting spaces, and wherein a front suspension mounting bracket and a rear extension mounting bracket are provided in the suspension mounting space, spaced apart from each other in the lengthwise direction of the vehicle body, and installed to connect one of the rear side members and one of the side walls.

11. The vehicle body structure of claim 10, wherein a shock absorber fixing bracket is installed between the front suspension mounting bracket and the rear extension mounting bracket and fixes the inserted shock absorber.

12. The vehicle body structure of claim 10, wherein a spring seat is provided at a lower side of the rear extension mounting bracket.

13. The vehicle body structure of claim 10, wherein the extension side brackets are coupled to the rear extension mounting brackets with the side wall of the floor panel interposed therebetween.

14. The vehicle body structure of claim 13, wherein the bulkheads are disposed in the partition member to which the extension side brackets are coupled.

15. The vehicle body structure of claim 10, wherein an additional rear cross member is further provided at the lower side of the floor panel and elongated in the transverse direction of the vehicle body structure to connect two opposite rear extension mounting brackets.

16. The vehicle body structure of claim 3, wherein the rear mounting brackets are provided at an upper side of a closed space defined by the bulkheads in the partition member.

17. A vehicle body structure comprising:
    a floor panel;
    rear side members respectively coupled to lower sides of two opposite ends of the floor panel and extending in a lengthwise direction of a vehicle;
    a partition member mounted and extending in a transverse direction of the lengthwise direction of the vehicle, the partition member protruding upward from the floor panel, the partition member having two opposite ends coupled to upper sides of the rear side members with the floor panel interposed therebetween, the partition member comprising:
    a front part coupled to an upper side of the floor panel;
    a rear part coupled to the upper side of the floor panel and spaced apart from the front part in a direction toward a rear side of a vehicle body; and
    an upper part configured to connect an upper end of the front part and an upper end of the rear part, the front part, the upper part, and the rear part each having a panel shape;
    a plurality of rear mounting brackets provided on an upper part of the partition member to support a rear side of a seat; and
    front mounting components provided at a front part of the partition member and disposed at the upper side of the floor panel to support a front side of the seat.

18. The vehicle body of claim 17 further comprising:
    quarter inner panels coupled to upper sides of the two opposite ends of the floor panel, the two opposite ends of the partition member being coupled to the quarter inner panels.

* * * * *